(12) United States Patent
Sasaki et al.

(10) Patent No.: US 7,153,629 B2
(45) Date of Patent: Dec. 26, 2006

(54) RELEASING SHEET

(75) Inventors: Yasushi Sasaki, Tokushima (JP); Daisuke Tomita, Saitama (JP)

(73) Assignee: Lintec Corporation, Tokyo (JP)

( * ) Notice: Subject to any disclaimer, the term of this patent is extended or adjusted under 35 U.S.C. 154(b) by 4 days.

(21) Appl. No.: 11/020,272

(22) Filed: Dec. 27, 2004

(65) Prior Publication Data
US 2005/0158568 A1 Jul. 21, 2005

(30) Foreign Application Priority Data
Jan. 16, 2004 (JP) ............................. 2004-009035
Jan. 26, 2004 (JP) ............................. 2004-016546

(51) Int. Cl.
*G03F 7/04* (2006.01)
*G03F 7/20* (2006.01)

(52) U.S. Cl. .................. 430/270.1; 430/200; 430/126; 430/256; 430/259; 430/262; 503/227; 428/32.12

(58) Field of Classification Search ............. 430/270.1, 430/200, 126, 256, 259, 262; 503/227; 428/32.12
See application file for complete search history.

(56) References Cited

U.S. PATENT DOCUMENTS

| | | | | |
|---|---|---|---|---|
| 5,013,711 A | * | 5/1991 | Egashira et al. | 503/227 |
| 5,122,553 A | * | 6/1992 | Takayama et al. | 523/514 |
| 5,139,835 A | * | 8/1992 | Kitamura et al. | 428/41.4 |
| 5,700,584 A | * | 12/1997 | Suematsu | 428/32.79 |
| 5,882,753 A | * | 3/1999 | Pedginski et al. | 428/40.7 |
| 5,919,552 A | * | 7/1999 | Malhotra | 428/32.1 |
| 6,042,984 A | * | 3/2000 | Taniguchi | 430/126 |
| 6,194,348 B1 | * | 2/2001 | Onishi et al. | 503/227 |
| 6,372,689 B1 | * | 4/2002 | Kuga et al. | 503/227 |
| 6,458,461 B1 | * | 10/2002 | Blair et al. | 428/447 |
| 6,489,415 B1 | * | 12/2002 | Hsu et al. | 526/177 |
| 6,857,736 B1 | * | 2/2005 | Onishi et al. | 347/105 |
| 6,869,910 B1 | * | 3/2005 | Williams et al. | 503/227 |
| 6,878,423 B1 | * | 4/2005 | Nakanishi | 428/32.12 |

FOREIGN PATENT DOCUMENTS

| | | |
|---|---|---|
| JP | 56-035139 | 4/1981 |
| JP | 60-078667 | 5/1985 |
| JP | 63-161414 | 7/1988 |
| JP | 04-004200 | 1/1992 |
| JP | 11-035759 | 2/1999 |
| WO | WO 01/15820 | 3/2001 |

* cited by examiner

*Primary Examiner*—Amanda Walke
(74) *Attorney, Agent, or Firm*—Oblon, Spivak, McClelland, Maier & Neustadt, P.C.

(57) ABSTRACT

There are disclosed a releasing sheet comprising a substrate and a releasing agent layer which is installed by coating the substrate with a releasing agent liquid containing 1,4-polybutadiene and an antioxidant, and irradiating the coated layer with ultraviolet ray so that the layer is cured; and also a releasing sheet comprising in turn a substrate, an undercoat layer which is formed thereon and is composed of an elastic body, and a releasing agent layer which is installed on the undercoat layer by coating the same with a releasing agent liquid containing 1,4-polybutadiene and an antioxidant, and irradiating the layers with ultraviolet ray so that the layers are cured. Being of non-silicone base, the releasing sheets are excellent in releasability from a tacky adhesive agent layer and adhesiveness to the substrate.

16 Claims, No Drawings

RELEASING SHEET

BACKGROUND OF THE INVENTION

1. Field of the Invention

The present invention relates to a releasing sheet. More particularly it pertains to a releasing sheet which is non-silicone based, is favorable in releasability from a tacky adhesive agent layer, brings about excellent adhesiveness between a releasing agent layer and a substrate, and is suitably employed for the purposes of use concerning precision electronic-machinery/equipment.

2. Description of the Related Arts

In recent years, a tacky adhesive sheet has been employed in a variety of stages and systems for the production processes of precision electronic-machinery/equipment such as ceramic capacitors, hard disc drives and semiconductor equipment.

Since in the case of the above-mentioned tacky adhesive sheet which is used in production processes of precision electronic-machinery/equipment, there is a fear that a silicone based tacky adhesive gives rise to electronic part troubles due to silicone compounds having a low molecular weight contained in the aforesaid tacky adhesive, there are used in general, non-silicone based tacky adhesives, for instance, tacky adhesives of acrylic base, polyester base, polyurethane base and the like.

The tacky adhesive sheet is laminated with a releasing sheet comprising a substrate and a releasing agent layer located thereon for the purpose of protecting the tacky adhesive agent layer until the time of use.

A silicone based releasing agent is frequently used in the releasing agent layer for the releasing sheet so far as the general purposes of use are concerned.

However in the case where use is made of the silicone based releasing agent for the above-mentioned purposes of use, there is a fear that silicone compounds having a low molecular weight contained in the aforesaid releasing agent migrate to a tacky adhesive agent layer and resides therein, thereby causing electronic part troubles as is the case with the silicone based tacky adhesive.

Accordingly an attempt is made to employ an alkyd based resin which is known as a non-silicone based releasing agent {for instance, refer to Japanese Patent Application Laid-Open No. 49685/1982 (Showa 57)} or a long-chain alkyl based resin {for instance, refer to Japanese Patent Application Laid-Open No. 249757/2002 (Heleisei 14)}.

Nevertheless in the case of using any of the resins thus cited, there is brought about a problem in that the releasing power between a tacky adhesive agent layer and a releasing agent layer is too strong to peel off the layers from each other.

SUMMARY OF THE INVENTION

It is an object of the present invention to provide a releasing sheet which is non-silicone based, and in which a releasing agent layer brings about excellent releasability from a tacky adhesive agent layer, and is excellent in time-lapse releasing stability and adhesiveness to a substrate.

Other object of the present invention will become obvious from the text of the specification hereinafter disclosed.

In order to achieve the above-mentioned objects, intensive extensive research and investigation were accumulated by the present inventors. As a result, it has been discovered that the objects can be achieved through a method in which a releasing agent layer is installed on a substrate by applying a coating of a releasing agent liquid containing 1,4-polybutadiene and an antioxidant onto a substrate, and irradiating the coating with ultraviolet ray, or through a method in which an undercoat layer composed of an elastic body and the above-mentioned releasing agent layer are consecutively installed on a substrate. The present invention has been accomplished by the foregoing findings and information. That is to say, the present invention provides the following.

1. A releasing sheet comprising a substrate and a releasing agent layer which is installed by coating the substrate with a releasing agent liquid containing 1,4-polybutadiene and an antioxidant, and irradiating the coated layer with ultraviolet ray so that the coated layer is cured;
2. The releasing sheet as set forth in the preceding item 1 wherein an irradiation amount of the ultraviolet ray is 1 to 50 mJ/cm$^2$;
3. The releasing sheet as set forth in the preceding item 1 wherein the content of the antioxidant is 0.1 to 15 parts by weight based on 100 parts by weight of the 1,4-polybutadiene;
4. The releasing sheet as set forth in the preceding item 1 wherein the coating amount of the releasing agent liquid is 0.01 to 1.5 g/m$^2$ expressed in terms of the weight of solid content;
5. A releasing sheet comprising in turn a substrate, an undercoat layer which is formed thereon and is composed of an elastic body and a releasing agent layer which is installed on the undercoat layer by coating the same with a releasing agent liquid containing 1,4-polybutadiene and an antioxidant, and irradiating the coated releasing agent layer with ultraviolet ray so that the coated layer is cured;
6. The releasing sheet as set forth in the preceding item 5 wherein an irradiation amount of the ultraviolet ray is 20 to 70 mJ/cm$^2$;
7. The releasing sheet as set forth in the preceding item 5 wherein the content of the antioxidant is 0.1 to 10 parts by weight based on 100 parts by weight of the 1,4-polybutadiene;
8. The releasing sheet as set forth in the preceding item 5 wherein the coating amount of the releasing agent liquid is 0.01 to 1.0 g/m$^2$ expressed in terms of the weight of solid content;
9. The releasing sheet as set forth in the preceding item 5 wherein the elastic body which constitutes the undercoat layer is polyurethane;
10. The releasing sheet as set forth in the preceding item 5 wherein the elastic body which constitutes the undercoat layer has a 100% modulus of elasticity of at most 35 MPa;
11. The releasing sheet as set forth in the preceding item 5 wherein the coating amount of the undercoat liquid which is intended to constitute the undercoat layer is 0.05 to 10 g/m$^2$ expressed in terms of the weight of solid content.

DESCRIPTION OF THE PREFERRED EMBODIMENTS

The releasing sheet according to the present invention is concerned with a releasing sheet comprising a substrate and a releasing agent layer which is installed by coating a substrate with a releasing agent liquid containing 1,4-polybutadiene and an antioxidant, and irradiating the coated layer with ultraviolet ray so that the layer is cured; and a releasing sheet comprising in turn a substrate, an undercoat layer (sometimes referred to as "elastic body layer") which is formed thereon and is composed of an elastic body and the foregoing a releasing agent layer (in the case of distinguishingly describing the releasing sheets, the former is referred to as "the first releasing sheet", and the latter as "the second releasing sheet")

The substrate in the releasing sheet according to the present invention is not specifically limited, but may be properly optionally selected for use from among the well known substrates and is exemplified by paper substrates such as glassine paper, coated paper, cast coated paper and dust free paper; laminated paper in which the paper substrate is laminated with thermoplastic resin such as polyethylene; films of polyester such as polyethylene terephthalate, polybutylene terephthalate and polyethylene naphthalate; films of polyolefin such as polypropylene and polymethylpentene; plastics films such as polycarbonate film and cellulose acetate based film; and laminated sheets each containing any of the foregoing.

The thickness of the substrate, which is not specifically limited, is preferably in the range of usually 10 to 150 µm.

In the case where a plastic film is used as the substrate, it is possible when desired, to subject the same to a physical or chemical surface treatment such as oxidation method, unevenly patterning method on the side where the releasing agent layer is installed for the purpose of enhancing the adhesiveness between the plastic film and the releasing agent layer. The above-mentioned oxidation method is exemplified, for instance, by a corona discharge treatment, chromic acid treatment, flame treatment, hot air treatment and ozone/ultraviolet ray irradiation treatment. The unevenly patterning method is exemplified, for instance, by a sand blast treatment method and solvent treatment method. The surface treatment method, which is properly optionally selected in accordance with the type of the substrate, is usually preferably a corona discharge treatment from the point of view of working effect and operability. A primer treatment may also be applied thereto.

The 1,4-polybutadiene to be used in the releasing agent liquid intended for constituting the releasing agent layer in the releasing sheet according to the present invention is that composed only of 1,4-bond except for 1,2-bond which is inevitably formed at the time of polymerization. In addition, the 1,4-polybutadiene may be either cis configuration or trans configuration, and those each having an optional cis content are usable.

In the present invention, the releasing agent liquid is incorporated with an antioxidant.

Examples of usable antioxidants, which are not specifically limited, include those that are well known such as of phosphite base, organosulfur base and hindered phenol base.

Specific examples of the commercially available phosphite-base antioxidant include those containing phosphite in the chemical structure formula such as (trade names) Irgafos 38, Irgafos P-EPQ and Irgafos 126 (each manufactured by Ciba Specialty Chemicals); Sumilizer TNP, Sumilizer TPP-P and Sumilizer P-16 (each manufactured by SUMITOMO CHEMICAL Co., Ltd.); Adekastab PEP-4C, Adekastab PEP-8, Adekastab 11C, Adekastab PEP-36, Adekastab HP-11, Adekastab 260, Adekastab 522A, Adekastab 329K, Adekastab 1500, Adekastab C, Adekastab 135A, Adekastab 3010 (each manufactured by ASAHI DENKA CO., LTD.) and the like.

Specific examples of the commercially available organosulfur-base antioxidant include those containing thioether in the chemical structure formula such as (trade names) Irganox PS 800FL and Irganox PS802FL (each manufactured by Ciba Specialty Chemicals.); Sumilizer TP-M, Sumilizer TP-D, Sumilizer TL and Sumilizer MB (each manufactured by SUMITOMO CHEMICAL Co., Ltd.); Adekastab AO-23 (manufactured by ASAHI DENKA CO., LTD.) and the like. Of those, Sumilizer TP-D, that is, pentaerythritil-tetrakis(3-laurylthiopropionate) is particularly preferable.

Specific examples of the commercially available hindered phenol-base antioxidant include those containing 2,6-alkylphenol in the chemical structure formula such as (trade names) Irganox 245, Irganox 259, Irganox 565, Irganox 1010, Irganox 1035, Irganox 1076, Irganox 1098, Irganox 1222, Irganox 1330, Irganox 1425, Irganox 3114, Irganox 1520, Irganox 1135, Irganox 1141, Irganox HP 2251 (each manufactured by Ciba Specialty Chemicals); Sumilizer BHT, Sumilizer MDP-S, Sumilizer GA-80, Sumilizer BBM-S, Sumilizer WX-R, Sumilizer GM, Sumilizer GS (each manufactured by SUMITOMO CHEMICAL Co., Ltd.); Adekastab AO-30 (manufactured by ASAHI DENKA CO., LTD.) and the like.

Any of the above-cited antioxidant may be used alone or in combination with at least one other species. The amount thereof to be used in the case of the first releasing sheet is preferably at least 0.1 part by weight based on 100 parts by weight of the 1,4-polybutadiene in terms of solid content from the standpoint of suppressing hard releasability due to deterioration in the 1,4-polybutadiene, and is preferably at most 15 parts by weight based on 100 parts by weight of the 1, 4-polybutadiene in terms of solid content from the aspect of sufficiently maintaining adhesiveness between the releasing agent and the substrate of the releasing sheet. That is to say, the amount thereof to be used is preferably in the range of 0.1 to 15 parts by weight based on 100 parts by weight of the 1, 4-polybutadiene in terms of solid content.

On the other hand, the amount of the antioxidant to be used in the case of the second releasing sheet is preferably at least 0.1 part by weight based on 100 parts by weight of the 1,4-polybutadiene in terms of solid content from the standpoint of suppressing hard releasability due to deterioration in the 1, 4-polybutadiene, and is preferably at most 10 parts by weight based on 100 parts by weight of the 1,4-polybutadiene in terms of solid content from the aspect of sufficiently maintaining adhesiveness between the releasing agent and the substrate of the releasing sheet. That is to say, the amount thereof to be used is preferably in the range of 0.1 to 10 parts by weight based on 100 parts by weight of the 1,4-polybutadiene in terms of solid content.

The releasing agent liquid in which the 1,4-polybutadiene, the antioxidant and an other component to be blended at need is dissolved in an organic solvent.

Such organic solvent may be selected for use from among well known solvents each having favorable solubility in the blending components.

The solvent to be used in this case is exemplified by toluene, xylene, methanol, ethanol, isobutanol, n-butanol, acetone, methyl ethyl ketone and tetrahydrofuran. Any of the above-cited solvent may be used alone or in combination with at least one other species.

Preferably, the releasing agent liquid is prepared so that the solid concentration is made to be in the range of 0.5 to 15% by weight using any of the above-cited solvent for the sake of convenience of coating.

The coating of the releasing agent liquid on the substrate (the first releasing sheet) or on the elastic body layer (the second releasing sheet) can be carried out by well known conventional method such as bar coat method, reverse roll coat method, knife coat method, roll knife coat method, gravure coat method, air doctor coat method and doctor blade coat method.

The coating amount of the releasing agent liquid in the case of the first releasing sheet is preferably at least 0.01 g/m² in terms of the weight of solid content for the purpose of obtaining necessary releasing power (easy releasability), and is preferably at most 1.5 g/m² in terms of the weight of solid content for the purpose of preventing blocking between the releasing agent layer and rear face of the substrate for the releasing sheet which may contact with each other at a time of keeping. That is to say, the coating amount of the releasing agent liquid in the case of the first releasing sheet is in the range of preferably 0.01 to 1.5 g/m², particularly preferably 0.02 to 0.2 g/m².

On the other hand, the coating amount of the releasing agent liquid in the case of the second releasing sheet is preferably at least 0.01 g/m² in terms of the weight of solid content for the purpose of obtaining necessary releasing power (easy releasability), and is preferably at most 1.0 g/m² in terms of the weight of solid content for the purpose of preventing blocking between the releasing agent layer and rear face of the substrate for the releasing sheet which may contact with each other at a time of keeping. That is to say, the coating amount of the releasing agent liquid in the case of the second releasing sheet is preferably in the range of 0.01 to 1.0 g/m², particularly preferably 0.02 to 0.2 g/m².

The releasing agent layer is formed by a method which comprises applying a coating of the releasing agent liquid to the above-mentioned substrate (the first releasing sheet) or to the elastic body layer (the second releasing sheet), heating to dry the coated layer at a temperature of about 40 to 160° C. for 30 seconds to 1 minute, then irradiating it with ultraviolet ray to crosslink the polybutadiene, and curing the same to form a releasing agent layer.

Usable ultraviolet lamps are available from previously well known lamps such as high pressure mercury lamp, metal halide lamp, high power metal halide lamp and non-electrode ultraviolet lamp. Of these, the non-electrode ultraviolet lamp is optimum from the viewpoint of curability of the polybutadiene.

The irradiation amount of ultraviolet ray in the case of the first releasing sheet is preferably at least 1 mJ/cm² from the standpoint of assuring high adhesiveness between the releasing agent and the substrate of the releasing sheet, and is preferably at most 50 mJ/cm² from the standpoint of assuring easy releasability between the releasing agent layer and the tacky adhesive agent layer. That is to say, the irradiation amount of ultraviolet ray in the case of the first releasing sheet is in the range of preferably 1 to 50 mJ/cm², particularly preferably 2 to 45 mJ/cm².

On the other hand, the irradiation amount of ultraviolet ray in the case of the second releasing sheet is preferably at least 20 mJ/cm² from the standpoint of assuring high adhesiveness between the releasing agent and the substrate of the releasing sheet, and is preferably at most 70 mJ/cm² from the standpoint of assuring easy releasability between the releasing agent layer and the tacky adhesive agent layer. That is to say, the irradiation amount of ultraviolet ray in the case of the second releasing sheet is in the range of preferably 20 to 70 mJ/cm², particularly preferably 22 to 66 mJ/cm².

The crosslinking through the ultraviolet ray irradiation can be carried out more efficiently by adding a photosensitizer to the releasing agent liquid. Specific examples of the photosensitizer imparting favorable results include aromatic ketones such as benzophenones, P,P'-dimethoxybenzophenone, P,P'-dichlorobenzophenone, P,P'-dimethylbenzophenone, acetophenones and acetonaphthone, while there are usable aromatic aldehydes such as terephthalaldehyde and quinone based aromatic compounds such as methyanthraquinone.

The tacky adhesive to be applied to the releasing sheet according to the present invention is not specifically limited, but may be properly optionally selected for use from previously well known tacky adhesives such as of acrylic base, polyester base and polyurethane base.

As materials intended for forming the elastic body layer in the second releasing sheet according to the present invention, there are usable such elastic body formed from such materials as natural resin exemplified by natural rubber; synthetic resins exemplified by polyurethane based resin, ethylene/vinyl acetate copolymer and polyolefin based resin; and synthetic rubber such as of styrene/butadiene base, chloroprene base, butyl base, ethylene/propylene base and acrylic base. Of those, polyurethane based synthetic resin such as polyurethane elastomer and modified polyurethane elastomer is preferable by reason of their having solvent resistance (insoluble) and excellent rubber elasticity.

In addition, from the aspect of assuring easy releasability, the elastic body has a 100% modulus of elasticity of preferably at most 35 MPa, particularly preferably at most 30 MPa.

The elastic body layer can be formed by applying a coating of undercoat liquid in which any of the above-cited materials is dissolved in an organic solvent, and drying the coating. Moreover it is possible at need to enhance its solvent resistance and adhesiveness to the substrate by ultraviolet irradiation after coating and drying. The organic solvent to be used in this case may be properly optionally selected for use from well known solvents having good solubility for the elastic body components. Such solvents, which are cited by the same solvents that have been exemplified as being usable for the releasing agent liquid, may be used alone or in combination with at least one other species.

Preferably the undercoat liquid is prepared so that the solid concentration is made to be in the range of 0.5 to 15% by weight using any of the above-cited solvent for the sake of convenience of coating. The coating of the undercoat liquid to the substrate can be carried out by any of previous well known coating methods as is the case with the above-described releasing agent liquid.

The elastic body layer is formed by applying a coating of the undercoat liquid to the substrate, heating to dry it at a temperature of about 40 to 160° C. for 30 seconds to 2 minutes.

The coating amount of the undercoat liquid is preferably at least 0.05 g/m² in terms of the weight of solid content for the purpose of assuring the time-lapse stability which is a working effect due to the installation of the layer, and is preferably at most 10 g/m² in terms of the weight of solid content for the purpose of preventing blocking and at the same time economically efficiently carrying out the coating work That is to say, the coating amount of the undercoat liquid is in the range of preferably 0.05 to 10 g/m², particularly preferably 0.1 to 1 g/m². In summarizing the working effect of the present invention, the releasing sheet according to the present invention brings about a releasing power as low as at most 1000 mN/25 mm, and also is excellent in a time-lapse releasing stability and adhesiveness to a substrate. Moreover, it can provide a tacky adhesive laminate which is preferably suitably used for applications in relation to precision electronic machinery/equipment such as mounting of electronic part items for printed wiring board and assembly of magnetic recorder (hard disc drive: HDD) without exerting adverse influence on the items upon application to the field of packaging for the electronic part items.

In what follows, the present invention will be described in more detail with reference to comparative examples and working examples, which however shall never limit the invention thereto.

EXAMPLE 1

One hundred parts by weight of cis 1,4-polybutadiene (manufactured by JSR Corporation under the trade name JSR BR-10, containing cis I, 4 bond of 95%) and 1 part by weight of antioxidant (manufactured by Ciba Specialty Chemicals under the trade name Irganox HP2251) were diluted with toluene to prepare a releasing agent liquid having a solid concentration of 1.0% by weight.

The releasing agent liquid thus prepared was applied as a coating to a surface of a polyethylene terephthalate (PET) film with a thickness of 38 µm (manufactured by MITSUBISHI POLYESTER CORPORATION under the trade name T100-38) in a coating amount (weight of solid content) of 0.1 $g/m^2$ by the use of a Myer bar #4, and thereafter the resultant coated layer was heated at 100° C. for 30 seconds to dry the same Subsequently the coated layer was irradiated with ultraviolet ray by means of a belt conveyer type ultraviolet ray irradiation apparatus equipped with a fusion H valve having one 240 W/cm lamp under the condition of the conveyer velocity being 40 m/minute (ultraviolet ray irradiation amount of 22 $mJ/cm^2$), and cured to prepare a releasing sheet equipped with the releasing agent layer.

Subsequently measurements were made of releasing strength and adhesiveness to the substrate each of the resultant releasing sheet as well as silicone compound content. The results are given in Table 1.

Measurements and evaluations of releasing strength and adhesiveness to the substrate each of the resultant releasing sheet as well as silicone compound content were made by the methods as described hereunder.

(1) Releasing Strength a) Releasing Power in Normal State

The releasing agent side of the releasing sheet that was the object of test and the tacky adhesive agent side of an acrylic tacky adhesive tape {a substrate being polyethylene terephthalate (PET) film with a thickness of 38 µm (manufactured by Toray Industries, Inc. under the trade name Lumirror E20#50, white), tacky adhesive being acrylic tacky adhesive (manufactured by LINTEC Corporation under the trade name NPL) in a coating amount (weight of solid content) of 24 $g/M^2$} were superimposed by bringing both the sides into contact with each other, and were stuck down to each other by one reciprocation with a 2 kg roller. The resultant specimen was allowed to stand for one or 7 days under the conditions of a temperature of 23° C. and a humidity of 50%, and a measurement was made of each releasing power (mN/20 mm) thereof by the use of a universal tensile testing machine (manufactured by ORIENTEC Co., LTD. under the trade name TENSILON UTM-4-100) under the conditions of a temperature of 23° C. and a humidity of 50% by peeling off the substrate side of the tacky adhesive tape to the direction of 180 degrees at a velocity of 300 mm/minute.

b) Releasing Power After Aging Acceleration

The releasing sheet that was the object of test was allowed to stand for one day under the conditions of a temperature of 23° C. and humidity of 50% or for one or 7 days under the condition of a temperature of 70° C., thereafter the releasing agent side of the releasing sheet and the tacky adhesive agent side of an acrylic tacky adhesive tape {a substrate being polyethylene terephthalate (PET) film with a thickness of 38 µm (manufactured by Toray Industries, Inc. under the trade name Lumirror E20#50, white), tacky adhesive being acrylic tacky adhesive (manufactured by LINTEC Corporation under the trade name NPL) in a coating amount (weight of solid content) of 24 $g/m^2$} were superimposed by bringing both the sides into contact with each other, and were stuck down to each other by one reciprocation with a 2 kg roller. The resultant specimen was allowed to stand for one day under the conditions of a temperature of 23° C. and a humidity of 50%, and a measurement was made of each releasing power (mN/20 mm) thereof by the method same as that in the preceding item a).

(2) Adhesiveness to Substrate

Removal and/or detaching of the releasing agent layer from a substrate were visibly observed by rub-off method wherein the releasing agent layer side of the releasing sheet that was the object of test was rubbed with a finger, and evaluations were made on the basis of the following criteria.

◯: favorable without Removal and/or detaching from substrate

Δ: Removal and/or detaching to some extent from substrate without any practical problem X: poor due to Removal and/or detaching from substrate (3) Measurement of Silicone Compound Amount A measurement was made of the silicone compound content in the releasing agent layer of the releasing sheet that was the object of test by X-ray photoelectron spectrometry (XPS) under the following conditions.

Measuring instrument: ESCA 5600 manufactured by Perkin Elmer Japan Co., Ltd.

X-ray source: Mg standard (15 kV, 400 W)

Takeout angle: 45 degrees

Measuring time: 3 minutes

Element measured: silicon (Si) and carbon (C), wherein Si amount was expressed in "%" by multiplying the value of Si/(Si+C) by 100

EXAMPLE 2

The procedure in Example 1 was repeated to prepare a releasing sheet except that the blending amount of the antioxidant was set on 10 parts by weight based on 100 parts by weight of the 1,4-poybutadiene.

Subsequently measurements were made of releasing strength and adhesiveness to the substrate each of the resultant releasing sheet as well as silicone compound content in the same manner as in Example 1. The results are given in Table 1.

EXAMPLE 3

The procedure in Example 1 was repeated to prepare a releasing sheet except that the Smilizer GS (trade name, manufactured by SUMITOMO CHEMICAL Co., Ltd.) was used as the antioxidant in place of the Irganox HP2251 (trade name).

Subsequently measurements were made of releasing strength and adhesiveness to the substrate each of the resultant releasing sheet as well as silicone compound content in the same manner as in Example 1. The results are given in Table 1.

EXAMPLE 4

The procedure in Example 1 was repeated to prepare a releasing sheet except that the Smilizer GS (trade name, manufactured by SUMITOMO CHEMICAL Co., Ltd.) was used as the antioxidant in place of the Irganox HP2251 (trade name), and that blending amount of the antioxidant was set on 10 parts by weight based on 100 parts by weight of the 1,4-poybutadiene.

Subsequently measurements were made of releasing strength and adhesiveness to the substrate each of the resultant releasing sheet as well as silicone compound content in the same manner as in Example 1. The results are given in Table 1.

COMPARATIVE EXAMPLE 1

The procedure in Example 1 was repeated to prepare a releasing sheet except that the blending of the antioxidant was omitted.

Subsequently measurements were made of releasing strength and adhesiveness to the substrate each of the resultant releasing sheet as well as silicone compound content in the same manner as in Example 1. The results are given in Table 1.

COMPARATIVE EXAMPLE 2

The procedure in Example 1 was repeated to prepare a releasing sheet except that the blending of the antioxidant was omitted and that ultraviolet ray irradiation was omitted.

Subsequently measurements were made of releasing strength and adhesiveness to the substrate each of the resultant releasing sheet as well as silicone compound content in the same manner as in Example 1. The results are given in Table 1.

COMPARATIVE EXAMPLE 3

The procedure in Example 1 was repeated to prepare a releasing sheet except that the ultraviolet ray irradiation was omitted.

Subsequently measurements were made of releasing strength and adhesiveness to the substrate each of the resultant releasing sheet as well as silicone compound content in the same manner as in Example 1. The results are given in Table 1.

EXAMPLE 5

The procedure in Example 1 was repeated to prepare a releasing sheet except that the ultraviolet ray irradiation after coating and drying of the releasing agent liquid was carried out by means of a belt conveyer type ultraviolet ray irradiation apparatus equipped with a fusion H valve having one 240 W/cm lamp under the condition of the conveyer velocity being 40 m/minute two times repeatedly (ultraviolet ray irradiation amount of 44 mJ/cm$^2$ instead of 22 mJ/cm$^2$).

Subsequently measurements were made of releasing strength and adhesiveness to the substrate each of the resultant releasing sheet as well as silicone compound content in the same manner as in Example 1. The results are given in Table 1.

EXAMPLE 6

The procedure in Example 1 was repeated to prepare a releasing sheet except that the ultraviolet ray irradiation after coating and drying of the releasing agent liquid was carried out by means of a belt conveyer type ultraviolet ray irradiation apparatus equipped with a fusion H valve having one 120 W/cm lamp under the condition of the conveyer velocity being 40 m/minute (ultraviolet ray irradiation amount of 11 mJ/cm$^2$ instead of 22 mJ/cm$^2$).

Subsequently measurements were made of releasing strength and adhesiveness to the substrate each of the resultant releasing sheet as well as silicone compound content in the same manner as in Example 1. The results are given in Table 1.

EXAMPLE 7

The procedure in Example 1 was repeated to prepare a releasing sheet except that the ultraviolet ray irradiation after coating and drying of the releasing agent liquid was carried out by means of a belt conveyer type ultraviolet ray irradiation apparatus equipped with a fusion H valve having one 60 W/cm lamp under the condition of the conveyer velocity being 40 m/minute (ultraviolet ray irradiation amount of 5.5 mJ/cm$^2$ instead of 22 mJ/cm$^2$).

Subsequently measurements were made of releasing strength and adhesiveness to the substrate each of the resultant releasing sheet as well as silicone compound content in the same manner as in Example 1. The results are given in Table 1.

EXAMPLE 8

The procedure in Example 1 was repeated to prepare a releasing sheet except that the ultraviolet ray irradiation after coating and drying of the releasing agent liquid was carried out by means of a belt conveyer type ultraviolet ray irradiation apparatus equipped with a fusion H valve having one 30 W/cm lamp under the condition of the conveyer velocity being 40 m/minute (ultraviolet ray irradiation amount of 2.8 mJ/cm$^2$ instead of 22 mJ/cm$^2$).

Subsequently measurements were made of releasing strength and adhesiveness to the substrate each of the resultant releasing sheet as well as silicone compound content in the same manner as in Example 1. The results are given in Table 1.

EXAMPLE 9

The procedure in Example 1 was repeated to prepare a releasing sheet except that the coating amount (weight of solid content) was set on 1.00 g/m$^2$ instead of 0.10 g/m$^2$ by making the solid concentration of the releasing agent liquid to be 10.0% by weight instead of 1.0% and that after coating and drying of the releasing agent liquid, ultraviolet ray irradiation was carried out by means of a belt conveyer type ultraviolet ray irradiation apparatus equipped with a fusion H valve having one 120 W/cm lamp under the condition of the conveyer velocity being 40 m/minute (ultraviolet ray irradiation amount of 11 mJ/cm$^2$ instead of 22 mJ/cm$^2$).

Subsequently measurements were made of releasing strength and adhesiveness to the substrate each of the resultant releasing sheet as well as silicone compound content in the same manner as in Example 1. The results are given in Table 1.

COMPARATIVE EXAMPLE 4

The procedure in Example 1 was repeated to prepare a releasing sheet except that 1,2-polybutadiene (manufactured by JSR Corporation under the trade name JSR RB810) was used in place of the cis 1,4-polybutadiene (manufactured by JSR Corporation under the trade name JSR BR-10).

Subsequently measurements were made of releasing strength and adhesiveness to the substrate each of the resultant releasing sheet as well as silicone compound content in the same manner as in Example 1. The results are given in Table 1.

COMPARATIVE EXAMPLE 5

One hundred parts by weight of a silicone based releasing agent (manufactured by Shin-Etsu Chemical Co., Ltd. under the trade name KS-847H) and 1 part by weight of a curing catalyst (manufactured by Shin-Etsu Chemical Co., Ltd. under the trade name CATPL-50T) were diluted with toluene to prepare a releasing agent liquid having a solid concentration of 1.1% by weight.

The releasing agent liquid thus prepared was applied as a coating to a surface of a polyethylene terephthlate (PET) film with a thickness of 38 μm (manufactured by MITSUBISHI POLYESTER CORPORATION under the trade name T 100-38) in a coating amount (weight of solid content) of 0.11 g/m$^2$ by the use of a Myer bar #4, and thereafter the resultant coated layer was heated at 130° C. for one minute to dry the same. Subsequently measurements were made of releasing strength and adhesiveness to the substrate each of the resultant releasing sheet as well as silicone compound content in the same manner as in Example 1. The results are given in Table 1

TABLE 1 (1/2)

| | Releasing agent | | Antioxidant | | Ultraviolet |
|---|---|---|---|---|---|
| | Type | Coating amount | Type | Blending amount | irradiation amount |
| Example 1 | BR-10 | 0.10 g/m$^2$ | IR-HP2251 | 1 wt % | 22 mJ/cm$^2$ |
| Example 2 | " | " | " | 10 wt % | " |
| Example 3 | " | " | Sumilizer GS | 1 wt % | " |
| Example 4 | " | " | " | 10 wt % | " |
| Comp. Example 1 | " | " | not blended | | " |
| Comp. Example 2 | " | " | " | " | not irradiated |
| Comp. Example 3 | " | " | IR-HP2251 | 1 wt % | " |
| Example 5 | " | " | " | 1 wt % | 44 mJ/cm$^2$ |
| Example 6 | " | " | " | " | 11 mJ/cm$^2$ |
| Example 7 | " | " | " | " | 5.5 mJ/cm$^2$ |
| Example 8 | " | " | " | " | 2.8 mJ/cm$^2$ |
| Example 9 | " | 1.00 g/m$^2$ | " | " | 11 mJ/cm$^2$ |
| Comp. Example 4 | RB810 | 0.10 g/m$^2$ | " | " | 22 mJ/cm$^2$ |
| Comp. Example 5 | KS-847H | 0.11 g/m$^2$ | CAT-PL-50T | " | not irradiated |

{Remarks}
Comp: Comparative
BR-10: cis 1,4-polybutadiene (manufactured by JSR Corporation)
RB810: 1,2-polybutadiene (manufactured by JSR Corporation)
KS-847H: silicone based releasing agent (manufactured by Shin-Etsu Chemical Co., Ltd.)
IR-HP2251: Irganox HP2251; antioxidant (manufactured by Ciba Speciality Chemicals)
Sumilizer GS; antioxidant (manufactured by SUMITOMO CHEMICAL Co., Ltd.)
CAT-PL50T: curing catalyst (manufactured by Shin-Etsu Chemical Co., Ltd.)

{Remarks}

Comp.: Comparative

BR-10: cis-1,4-polybutadiene (manufactured by JSR Corporation)

RB 810: 1,2-polybutadiene (manufactured by JSR Corporation)

KS-847H: silicone based releasing agent(manufactured by Shin-Etsu Chemical Co., Ltd.)

IR-HP2251: Irganox HP2251; antioxidant (manufactured by Ciba Specialty Chemicals)

Sumilizer GS; antioxidant (manufactured by SUMITOMO CHEMICAL Co., Ltd.)

CAT-PL-50T: curing catalyst (manufactured by Shin-Etsu Chemical Co., Ltd.)

TABLE 1 (2/2)

| | Adhesiveness to substrate | Releasing power in normal state (mN/20 mm) | | Releasing power after aging acceleration of (mN/20 mm) | | | Silicone compound content(%) |
|---|---|---|---|---|---|---|---|
| | | After a day | After 7 days | a day 23° C. | a day 70° C. | 7 days 70° C. | |
| Example 1 | ○ | 145 | 198 | 145 | 72 | 110 | 0.0% |
| Example 2 | " | 295 | 380 | 295 | 177 | 180 | " |
| Example 3 | " | 182 | 280 | 182 | 200 | 235 | " |
| Example 4 | " | 210 | 370 | 210 | 140 | 225 | " |
| Comp. Example 1 | " | 150 | 510 | 150 | 320 | 5700 | " |
| Comp. Example 2 | X | 70 | 107 | 70 | 320 | 6600 | " |
| Comp. Example 3 | " | 74 | 86 | 74 | 70 | 86 | " |
| Example 5 | ○ | 266 | 327 | 266 | 274 | 283 | " |
| Example 6 | " | 100 | 165 | 100 | 95 | 105 | " |
| Example 7 | " | 90 | 130 | 90 | 90 | 95 | " |

TABLE 1-continued (2/2)

|  | Adhesiveness to substrate | Releasing power in normal state (mN/20 mm) | | Releasing power after aging acceleration of (mN/20 mm) | | | Silicone compound content(%) |
| --- | --- | --- | --- | --- | --- | --- | --- |
|  |  | After a day | After 7 days | a day 23° C. | a day 70° C. | 7 days 70° C. |  |
| Example 8 | " | 85 | 125 | 85 | 90 | 92 | " |
| Example 9 | " | 70 | 100 | 70 | 72 | 78 | " |
| Comp. Example 4 | X | 2500 | 4200 | 2500 | 4000 | 8300 | " |
| Comp. Example 5 | ○ | 57 | 80 | 57 | 55 | 50 | 23.8% |

EXAMPLE 10

A polyurethane resin (manufactured by DAINIPPON INK AND CHEMICALS, INC. under the trade name CRISVON 5150S, 50% concentrate), an isocyanate based curing agent (manufactured by DAINIPPON INK AND CHEMICALS, INC. under the trade name CRISVON NX) and a curing accelerator (manufactured by DAINIPPON INK AND CHEMICALS, INC. under the trade name CRISVON ACCEL HM) at a solid blending ratio by parts by weight of 100/25/1.5 were diluted with methyl ethyl ketone, so that an undercoat liquid having a solid concentration of 2% by weight was prepared. The undercoat liquid thus prepared was applied as a coating to a surface of a polyethylene terephthalate (PET) film with a thickness of 38 μm (manufactured by MITSUBISHI POLYESTER CORPORATION under the trade name T100-38) in a coating amount (weight of solid content) of 0.1 2 g/m² by the use of a Myer bar #4, and thereafter the resultant coated layer was heated at 130° C. for 60 seconds to dry the same and thus prepare an elastic body layer (under coat layer) having a solid content by weight of 0.12% and a 100% modulus of elasticity of 30 MPa.

1,4-Polybutadiene (manufactured by ZEON CORPORATION under the trade name Nipol 1241) was diluted with toluene to prepare a releasing agent liquid having a solid concentration by weight of 0.5%. The resultant releasing agent liquid was blended with an antioxidant (manufactured by Ciba Specialty Chemicals under the trade name Irganox HP2251) at a ratio of one part by weight based on 100 parts by weight of the 1,4-polybutadiene in terms of the weight of solid content.

The releasing agent liquid thus prepared was applied as a coating to a surface of the above-prepared elastic body layer in a coating amount (weight of solid content) of 0.03 g/m² by the use of a Myer bar #4, and thereafter the resultant coated layer was heated at 130° C. for 60 seconds to dry the same.

Subsequently the coated layer was irradiated with ultraviolet ray by means of a belt conveyer type ultraviolet ray irradiation apparatus equipped with a fusion H valve having one 240 W/cm lamp under the condition of the conveyer velocity being 40 m/minute (ultraviolet ray irradiation amount of 22 mJ/cm²), and cured to prepare a releasing sheet equipped with the releasing agent layer.

Subsequently measurements were made of releasing strength and adhesiveness to the substrate each of the resultant releasing sheet as well as migrated silicone compound content. The results are given in Table 2.

Measurements and evaluations of releasing strength, adhesiveness to the substrate, migrated silicone compound content and 100% modulus of elasticity each of the resultant releasing sheet were made in accordance with the methods as described hereunder.

(1) Releasing Strength

An acrylic tacky adhesive agent (manufactured by LINTEC Corporation under the trade name NPL) was applied as a coating to a surface of a polyethylene terephthlate (PET) film with a thickness of 38 μm (manufactured by Toray Industries, Inc. under the trade name Lumirror E20 #50, white) by the use of an applicator, and thereafter the resultant coated layer was heated at 110° C. for one minute to dry the same and prepare a tacky adhesive sheet having a tacky adhesive agent layer having a solid content by weight of 24 g/m².

The releasing agent side of the releasing sheet that was the object of test and the tacky adhesive agent side of the above-prepared tacky adhesive sheet were superimpose by bringing both the sides into contact with each other, stuck down to each other by one reciprocation with a 2 kg roller, and thereafter subjected to aging for 7 days under a load of 100 g/cm² in an atmosphere of a temperature being 23° C. and a humidity being 50% and in an atmosphere of a temperature being 70° C.

Thereafter, in accordance with JIS-Z0237, a measurement was made of the releasing power of the releasing agent layer by the use of a Universal tensile testing machine (manufactured by ORIENTEC Co., LTD under the trade name TENSILON UTM-4-100) by peeling off the substrate side of the tacky adhesive sheet in a direction of 180 degrees at a velocity of 300 mm/minute as the releasing strength (mN/25 mm).

(2) Adhesiveness to Substrate

Adhesiveness to substrate was evaluated in the method same as that described in Example 1.

(3) Amount of Migrated Silicone Compound

In the same method as in the preceding item (1), the releasing sheet and a non-silicone based tacky adhesive sheet were stuck down to each other, allowed to stand for 7 days in an atmosphere of a temperature being 23° C. and a humidity of 50%, and thereafter cut off into 10×10 cm, whereupon the releasing sheet was peeled off.

The remaining tacky adhesive sheet was extracted with n-hexane at 23° C. for 30 seconds, and the extracted liquid thus obtained was placed in an agate mortar to vaporize the n-hexane.

The residue in the agate mortar and 0.05 g of potassium bromide were made into tablets, the silicone amount contained therein was measured with a beam condenser (manufactured by Perkin Elmer Japan Co., Ltd. Model: FT-IR), and silicone compound content per unit area of the tacky adhesive sheet was determined by using calibration curve. The content thus obtained was regarded as amount of silicone compound which migrated from the releasing agent layer to the tacky adhesive agent layer.

(4) 100% Modulus of Elasticity

Blended liquid of polyurethane resin was applied as coating to an alkyd resin face of a paper/alkyd resin based protective sheet (manufactured by LINTEC Corporation under the trade name ES160SK -2C). The coated sheet was heated at 70° C. for 2 minutes further at 130° C. for 3 minutes to attain a thickness of 40 µm, and allowed to stand for one week in an atmosphere of a temperature being 23° C. and a humidity being 50%. Thereafter, a measurement was made of a stress—elongation diagram using a tensile testing machine and a specimen having a width of 5 mm at a tensile speed of 300 mm/minute and a tensile spacing of 20 mm, and the stress value at which the elongation became 100% was regarded as 100% modulus of elasticity expressed in terms of MPa.

EXAMPLE 11

The procedure in Example 10 was repeated to prepare a releasing sheet except that an elastic body layer having a 100% modulus of elasticity of 10 MPa was formed by using the same undercoat liquid as therein and that the solid blending ratio by parts by weight of the polyurethane resin/isocyanate based curing agent/curing accelerator was altered to 100/15/1.5 from 100/25/1.5.

Subsequently measurements were made of releasing strength and adhesiveness to the substrate each of the resultant releasing sheet as well as migrated silicone compound content in the same manner as in Example 10. The results are given in Table 2.

EXAMPLE 12

The procedure in Example 10 was repeated to prepare a releasing sheet except that an elastic body layer having a 100% modulus of elasticity of 3.5 MPa was formed by using the same undercoat liquid as therein and that the solid blending ratio by parts by weight of the polyurethane resin/isocyanate based curing agent/curing accelerator was altered to 100/5/1.5 from 100/25/1.5.

Subsequently measurements were made of releasing strength and adhesiveness to the substrate each of the resultant releasing sheet as well as migrated silicone compound content in the same manner as in Example 10. The results are given in Table 2.

COMPARATIVE EXAMPLE 6

A thermosetting polyester resin (manufactured by DAINIPPON INK AND CHEMICALS, INC. under the trade name OF 2617, 50% concentrate) and an isocyanate based curing agent (manufactured by DAINIPPON INK AND CHEMICALS, INC. under the trade name CRISVON NX) at a solid blending ratio by parts by weight of 100/6 were diluted with methyl ethyl ketone, so that an undercoat liquid having a solid concentration of 2% by weight was prepared. Subsequently the procedure in Example 10 was repeated to prepare a releasing sheet except that by the use of the undercoat liquid thus prepared, there was formed an undercoat layer (coating amount of 0.12 g/m$^2$ by solid weight) composed of the inelastic thermosetting polyester resin.

Subsequently measurements were made of releasing strength and adhesiveness to the substrate each of the resultant releasing sheet as well as migrated silicone compound content in the same manner as in Example 10. The results are given in Table 2.

EXAMPLE 13

The procedure in Example 12 was repeated to prepare a releasing sheet except that the ultraviolet ray irradiation after coating and drying of the releasing agent liquid was carried out by means of a belt conveyer type ultraviolet ray irradiation apparatus equipped with a fusion H valve having one 240 W/cm lamp under the condition of the conveyer velocity being 40 m/minute two times repeatedly (ultraviolet ray irradiation amount of 44 mJ/cm$^2$) instead of 22 mJ/cm$^2$).

Subsequently measurements were made of releasing strength and adhesiveness to the substrate each of the resultant releasing sheet as well as migrated silicone compound content in the same manner as in Example 10. The results are given in Table 2.

EXAMPLE 14

The procedure in Example 12 was repeated to prepare a releasing sheet except that the ultraviolet ray irradiation after coating and drying of the releasing agent liquid was carried out by means of a belt conveyer type ultraviolet ray irradiation apparatus equipped with a fusion H valve having one 240 W/cm lamp under the condition of the conveyer velocity being 40 m/minute three times repeatedly (ultraviolet ray irradiation amount of 66 mJ/cm$^2$ instead of 22 mJ/cm$^2$).

Subsequently measurements were made of releasing strength and adhesiveness to the substrate each of the resultant releasing sheet as well as migrated silicone compound content in the same manner as in Example 10. The results are given in Table 2.

COMPARATIVE EXAMPLE 7

The procedure in Example 12 was repeated to prepare a releasing sheet except that the ultraviolet ray irradiation was omitted.

Subsequently measurements were made of releasing strength and adhesiveness to the substrate each of the resultant releasing sheet as well as migrated silicone compound content in the same manner as in Example 10. The results are given in Table 2.

EXAMPLE 15

The procedure in Example 12 was repeated to prepare a releasing sheet except that the coating amount (weight of solid content) was set on 0.06 g/m$^2$ instead of 0.03 g/m$^2$ by making the solid concentration of the releasing agent liquid to be 1.0%.

Subsequently measurements were made of releasing strength and adhesiveness to the substrate each of the resultant releasing sheet as well as migrated silicone compound content in the same manner as in Example 10. The results are given in Table 2.

EXAMPLE 16

The procedure in Example 12 was repeated to prepare a releasing sheet except that the coating amount (weight of solid content) was set on 0.12 g/m² instead of 0.03 g/m² by making the solid concentration of the releasing agent liquid to be 2.0%.

Subsequently measurements were made of releasing strength and adhesiveness to the substrate each of the resultant releasing sheet as well as migrated silicone compound content in the same manner as in Example 10. The results are given in Table 2.

EXAMPLE 17

The procedure in Example 12 was repeated to prepare a releasing sheet except that the coating amount (weight of solid content) was set on 0.30 g/m² instead of 0.12 g/m² by making the solid concentration of the undercoat liquid to be 5.0%.

Subsequently measurements were made of releasing strength and adhesiveness to the substrate each of the resultant releasing sheet as well as migrated silicone compound content in the same manner as in Example 10. The results are given in Table 2.

EXAMPLE 18

The procedure in Example 12 was repeated to prepare a releasing sheet except that the coating amount (weight of solid content) was set on 0.60 g/m² instead of 0.12 g/m² by making the solid concentration of the undercoat liquid to be 10.0%.

Subsequently measurements were made of releasing strength and adhesiveness to the substrate each of the resultant releasing sheet as well as migrated silicone compound content in the same manner as in Example 10. The results are given in Table 2.

COMPARATIVE EXAMPLE 8

The procedure in Example 12 was repeated to prepare a releasing sheet except that blending of an antioxidant in the releasing agent liquid was omitted.

Subsequently measurements were made of releasing strength and adhesiveness to the substrate each of the resultant releasing sheet as well as migrated silicone compound content in the same manner as in Example 10. The results are given in Table 2.

COMPARATIVE EXAMPLE 9

About a releasing sheet using PET in a substrate and dimethylpolysiloxane based releasing agent in a releasing agent layer, respectively (manufactured by LINTEC Corporation under the trade name PET380 1), measurements were made of releasing strength and adhesiveness to the substrate each of the resultant releasing sheet as well as migrated silicone compound content in the same manner as in Example 10. The results are given in Table 2.

TABLE 2

(1/2)

| | Undercoat layer | | | Releasing agent | | Antioxidant | | Ultraviolet |
|---|---|---|---|---|---|---|---|---|
| | Type | 100% Modulus | Coating amount | Type | Coating Amount | Type | Blend amount | Irradiation amount |
| Example 10 | PU | 30 MPa | 0.12 g/m² | Nipol 1241 | 0.03 g/m² | IR-HP 2251 | 1 wt % | 22 mJ/cm² |
| Example 11 | " | 10 MPa | " | Nipol 1241 | " | IR-HP 2251 | " | " |
| Example 12 | " | 3.5 MPa | " | Nipol 1241 | " | IR-HP 2251 | " | " |
| Comp. Example 6 | Thermosetting polyester resin | | " | Nipol 1241 | " | IR-HP 2251 | " | " |
| Example 13 | PU | 3.5 MPa | " | Nipol 1241 | " | IR-HP 2251 | " | 44 mJ/cm² |
| Example 14 | " | " | " | Nipol 1241 | " | IR-HP 2251 | " | 66 mJ/cm² |
| Comp. Example 7 | " | " | " | Nipol 1241 | " | IR-HP 2251 | " | not irradiated |
| Example 15 | " | " | " | Nipol 1241 | 0.06 g/m² | IR-HP 2251 | " | 22 mJ/cm² |
| Example 16 | " | " | " | Nipol 1241 | 0.12 g/m² | IR-HP 2251 | " | " |
| Example 17 | " | " | 0.30 g/m² | Nipol 1241 | 0.03 g/m² | IR-HP 2251 | " | " |
| Example 18 | " | " | 0.60 g/m² | Nipol 1241 | " | IR-HP 2251 | " | " |

TABLE 2-continued (1/2)

| | Undercoat layer | | | Releasing agent | | Antioxidant | | Ultraviolet |
|---|---|---|---|---|---|---|---|---|
| | Type | 100% Modulus | Coating amount | Type | Coating Amount | Type | Blend amount | Irradiation amount |
| Comp. Example 8 | " | " | 0.12 g/m² | Nipol 1241 | " | not blended | | " |
| Comp. Example 9 | not installed | | | see "Remarks" | | not blended | | not irradiated |

{Remarks}
Comp: Comparative
PU: Polyurethane resin (manufactured by DAINIPPON INK AND CHEMICALS, INC. under the trade name CRISVON 5150 S)
Nipol 1241: 1,4-polybutadiene (manufactured by ZEON CORPORATION)
IR-HP2251: Irganox HP2251; Antioxidant (manufactured by Ciba Speciality Chemicals)
Sumilizer GS; antioxidant (manufactured by SUMITOMO CHEMICAL Co., Ltd.)
Com. Example 9: dimethylpolysiloxane based releasing agent was used.

{Remarks}
Comp.: Comparative
PU: Polyurethane resin (manufactured by DAINIPPON INK AND CHEMICALS, INC. under the trade name CRISVON 5150 S)
Nipol 1241: 1,4-polybutadiene (manufactured by ZEON CORPORATION)
IR-HP2251: Irganox HP2251; Antioxidant (manufactured by Ciba Specialty Chemicals)
Sumilizer GS; antioxidant (manufactured by SUMITOMO CHEMICAL Co., Ltd.)
Com. Example 9: dimethylpolysiloxane based releasing agent was used.

TABLE 2

(2/2)

| | Releasing strength (mN/25 mm) | | Adhesiveness | Migrated silicone compound amount |
|---|---|---|---|---|
| | 23° C. | 70° C. | | |
| Example 10 | 197 | 247 | ○ | not detected |
| Example 11 | 170 | 307 | " | " |
| Example 12 | 213 | 240 | " | " |
| Comp. Example 6 | 1437 | 2600 | " | " |
| Example 13 | 182 | 350 | " | " |
| Example 14 | 263 | 840 | " | " |
| Comp. Example 7 | 6200 | 7738 | X | " |
| Example 15 | 170 | 257 | ○ | " |
| Example 16 | 143 | 187 | " | " |
| Example 17 | 273 | 653 | " | " |
| Example 18 | 360 | 840 | " | " |
| Comp. Example 8 | 210 | 7750 | " | " |
| Comp. Example 9 | 78 | 118 | " | 6300 μg/m² |

What is claimed is:

1. A releasing sheet comprising a substrate, an optional undercoat layer, and a releasing agent layer prepared by coating the substrate, or if present prepared by coating the undercoat layer, with a releasing agent liquid composition comprising polymer and at least one antioxidant, and irradiating the coated layer with ultraviolet ray such that the layer is cured, wherein the polymer consists of 1,4-polybutadiene.

2. The releasing sheet according to claim 1 wherein the releasing agent layer was cured with an irradiation amount of ultraviolet ray of 1 to 50 mJ/cm².

3. The releasing sheet according to claim 1 wherein the content of the antioxidant is 0.1 to 15 parts by weight based on 100 parts by weight of the 1, 4-polybutadiene.

4. The releasing sheet according to claim 1 wherein the coating amount of the releasing agent liquid is 0.01 to 1.5 g/m² expressed in terms of the weight of solid content.

5. A releasing sheet according to claim 1, comprising said undercoat layer.

6. The releasing sheet according to claim 5 wherein the releasing agent layer was cured with an irradiation amount of ultraviolet ray of 20 to 70 mJ/cm².

7. The releasing sheet according to claim 5 wherein the content of the antioxidant is 0.1 to 10 parts by weight based on 100 parts by weight of the 1, 4-polybutadiene.

8. The releasing sheet according to claim 5 wherein the coating amount of the releasing agent liquid is 0.01 to 1.0 g/m² expressed in terms of the weight of solid content.

9. The releasing sheet according to claim 5 wherein the undercoat layer is polyurethane.

10. The releasing sheet according to claim 5 wherein the undercoat layer has a 100% modulus of elasticity of at most 35 MPa.

11. The releasing sheet according to claim 5 wherein the undercoat layer is present in an amount of 0.05 to 10 g/m² expressed in terms of the weight of solid content.

12. The releasing sheet according to claim 1, wherein said releasing agent liquid composition further comprises a photosensitizer.

13. The releasing sheet according to claim 3, wherein said releasing agent liquid composition further comprises a photosensitizer.

14. The releasing sheet according to claim 5, wherein said releasing agent liquid composition further comprises a photosensitizer.

15. The releasing sheet according to claim 7, wherein said releasing agent liquid composition further comprises a photosensitizer.

16. The releasing sheet according to claim 8, wherein said releasing agent liquid composition further comprises a photosensitizer.

* * * * *